(12) United States Patent
Fukui et al.

(10) Patent No.: US 7,509,717 B2
(45) Date of Patent: Mar. 31, 2009

(54) METHOD OF PRODUCTION OF MULTILAYER CERAMIC ELECTRONIC DEVICE

(75) Inventors: Takashi Fukui, Chuo-ku (JP); Kaname Ueda, Chuo-ku (JP); Shintaro Kon, Chuo-ku (JP); Arata Sato, Chuo-ku (JP); Akira Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 425 days.

(21) Appl. No.: 11/386,666

(22) Filed: Mar. 23, 2006

(65) Prior Publication Data

US 2006/0213604 A1  Sep. 28, 2006

(30) Foreign Application Priority Data

Mar. 24, 2005  (JP)  ............................. 2005-086825

(51) Int. Cl.
H01G 9/07  (2006.01)
(52) U.S. Cl. ........................ 29/25.42; 29/25.41; 29/830; 361/321.2; 501/136
(58) Field of Classification Search ................. 29/830, 29/846, 825, 592.1, 25.01–25.03, 25.35–25.42; 361/321.1–321.5, 320, 306.3, 311, 309, 303; 501/134–138
See application file for complete search history.

(56) References Cited

U.S. PATENT DOCUMENTS

| | | | | |
|---|---|---|---|---|
| 4,739,544 A | * | 4/1988 | Okazaki et al. | ............ 29/25.42 |
| 5,258,153 A | * | 11/1993 | Chapas et al. | ................ 264/104 |
| 6,478,920 B1 | * | 11/2002 | Kanoh et al. | ................. 156/250 |
| 6,628,502 B2 | * | 9/2003 | Masumiya et al. | ....... 361/321.2 |
| 6,947,276 B2 | * | 9/2005 | Hirata et al. | ............. 361/306.3 |
| 7,206,187 B2 | * | 4/2007 | Satou | ......................... 361/309 |
| 7,276,130 B2 | * | 10/2007 | Hibi et al. | ................. 156/89.14 |
| 2002/0149040 A1 | | 10/2002 | Sun et al. | |
| 2005/0095851 A1 | | 5/2005 | Watanabe et al. | |

FOREIGN PATENT DOCUMENTS

| | | |
|---|---|---|
| EP | 0 924 721 A1 | 6/1999 |
| EP | 1 186 578 A2 | 3/2002 |
| EP | 1 498 944 A1 | 1/2005 |
| JP | 8-124785 | 5/1996 |
| JP | 10-163063 | 6/1998 |
| JP | 2000-124058 | 4/2000 |

* cited by examiner

*Primary Examiner*—Minh Trinh
(74) *Attorney, Agent, or Firm*—Oliff & Berridge, PLC

(57) ABSTRACT

A method of production of a multilayer ceramic electronic device having dielectric layers with an interlayer thickness of 5 μm or less and internal electrode layers including a base metal, including the steps of firing, then annealing a stack comprised of a dielectric layer paste and an internal electrode layer paste including a base metal alternately arranged in 100 layers or more under a reducing atmosphere, treating the annealed stack by first heat treatment under a strong reducing atmosphere of an oxygen partial pressure P3 of over $2.9 \times 10^{-39}$ Pa to less than $6.7 \times 10^{-24}$ Pa at a holding temperature T3 of over 300° C. to less than 600° C. The stack after the first heat treatment is treated by second heat treatment under an atmosphere of an oxygen partial pressure P4 of over $1.9 \times 10^{-7}$ Pa to less than $4.1 \times 10^{-3}$ Pa at a holding temperature T4 of over 500° C. to less than 1000° C.

4 Claims, 2 Drawing Sheets

METHOD OF PRODUCTION OF MULTILAYER CERAMIC ELECTRONIC DEVICE

BACKGROUND OF THE INVENTION

1. Field of the Invention

The present invention relates to a method of production of a multilayer ceramic capacitor or other multilayer ceramic electronic device.

2. Description of the Related Art

In recent years, as the materials of internal electrode layers of multilayer ceramic capacitors, one type of multilayer ceramic electronic device, it has become possible to use Ni or other inexpensive base materials in place of Pt, Pd, and other expensive precious metals and thereby realize great cost savings.

However, for suitable metallization of the internal electrode layers using a base metal, the green chip has to be fired under a reducing atmosphere. Further, to give the dielectric material reduction resistance for firing under a reducing atmosphere, sometimes Mn is included in the dielectric layers in the green chip before firing. Further, after firing under a reducing atmosphere, to cause reoxidation of the dielectric layers in the sintered body, usually the sintered body is annealed.

Document 1 (Japanese Patent Publication (A) No. 2000-124058) discloses the technology of producing a multilayer ceramic capacitor including internal electrode layers using a base metal by firing together with a reduction resistant dielectric material in a reducing atmosphere, then annealing in a neutral atmosphere with a higher oxygen partial pressure than the firing atmosphere.

Document 2 (Japanese Patent Publication (A) No. 10-163063) discloses technology for controlling the oxygen partial pressure in the treatment atmosphere at the time of the annealing by the $CO_2$ gas or $N_2$ gas and making the holding temperature at the time of annealing 600 to 1100° C. Document 3 (Japanese Patent Publication (A) No. 8-124785) discloses technology for making the holding temperature at the time of annealing 500 to 1100° C. (for example 900° C.) and making the holding time at the holding temperature 9 hours.

That is, in each of the above Patent Documents 1 to 3, after firing the green chip, the obtained sintered body is only annealed.

However, under recent conditions where greater capacity and smaller thickness of the dielectric are being promoted more and the dielectric ratio in recent capacitors is being increasingly reduced, even if optimizing just the annealing conditions, it is difficult to produce capacitors superior in various types of characteristics.

In particular, in conventional technology performing annealing after firing, the IR temperature dependency from room temperature to the high temperature region was good, but the treatment temperature and oxygen partial pressure in the annealing atmosphere could not be suitably controlled and the ends of the internal electrode layers (parts to be electrically connected to the external terminal electrodes) oxidized in some cases. If the ends of the internal electrode layers become oxidized, contact with the external end electrodes formed at the ends of the capacitor body becomes insufficient. As a result, the final product, that is, the capacitor, varies in capacity (capacity variation). End oxidation of the internal electrode layers tended to become worse the thinner and greater the number of the dielectric layers.

SUMMARY OF THE INVENTION

An object of the present invention is to provide a method of production of a multilayer ceramic capacitor or other multilayer ceramic electronic device able to reduce the end oxidation of internal electrode layers using base metals without causing deterioration of the IR temperature dependency and as a result able to reduce fluctuations in capacity.

To achieve the above object, according to the present invention, there is provided a method of production of a multilayer ceramic electronic device having dielectric layers with an interlayer thickness of 5 μm or less and internal electrode layers including a base metal, comprising a step of firing, then annealing a stack comprised of 100 layers or more of alternate dielectric layer paste and internal electrode layer paste including a base metal under a reducing atmosphere, a step of first heat treatment of the annealed stack under a strong reducing atmosphere of an oxygen partial pressure P3 of over $2.9 \times 10^{-39}$ Pa to less than $6.7 \times 10^{-24}$ Pa and a holding temperature T3 of over 300° C. to less than 600° C., and a step of second heat treatment of the stack after first heat treatment under an atmosphere of an oxygen partial pressure P4 of over $1.9 \times 10^{-7}$ Pa to less than $4.1 \times 10^{-3}$ Pa and a holding temperature T4 of over 500° C. to less than 1000° C.

Preferably, the partial pressure P3 is $1.3 \times 10^{-32}$ to $1.1 \times 10^{-25}$ Pa, the temperature T3 is 400 to 550° C., the partial pressure P4 is $3.5 \times 10^{-6}$ to $1.1 \times 10^{-3}$ Pa, and the temperature T4 is 600 to 900° C.

Preferably, a mixed gas of a wet $N_2$ gas and a dry $N_2$ gas and $H_2$ gas is used to adjust the P3 and/or P4.

Preferably, the dielectric layer paste has a barium titanate material having an average particle size of 0.1 to 1.0 μm, a glass ingredient material, and an additive ingredient material; the glass ingredient material has a Ba compound and/or Ca compound and Si compound; and the additive ingredient material has an Mg compound, an Mn compound, one or two of compounds or more selected from a V compound, W compound and Mo compound, and an R (where, R is one or two of elements or more selected from Y, Sc, Eu, Gd, Dy, Ho, Er, Tm, Yb, Lu, and Tb) compound, when the barium titanate material is converted to $BaTiO_3$, the Ba compound to BaO, the Ca compound to CaO, the Si compound to $SiO_2$, the Mg compound to MgO, the Mn compound to MnO, the V compound to $V_2O_5$, the W compound to $WO_3$, the Mo compound to MoO, and the R compound to $R_2O_3$, the ratio to $BaTiO_3$: 100 mol is Ba compound+Ca compound: 0.1 to 12 mol, Si compound: 0.1 to 12 mol, Mg compound: 3 mol or less (however, excluding 0 mol), Mn compound: 0.5 mol or less (however, excluding 0 mol), V compound+W compound+Mo compound: 0.3 mol or less (however, excluding 0 mol), R compound: 0.02 to 5 mol.

Note that in the present invention, "holding temperature" means, in addition to the literal meaning, the highest temperature.

The inventors discovered the following in the production of a multilayer ceramic capacitor or other multilayer ceramic electronic device including internal electrode layers using a base metal. That is, if the annealing conditions are too strong (temperature: high, oxygen partial pressure: high), the dielectric layers can be reoxidized well, but the internal electrode layers become susceptible to end oxidation and as a result capacity variation occurs. On the other hand, when the annealing conditions are weak (temperature: low, oxygen partial pressure: low), reoxidation of the dielectric layers tends to become insufficient.

The inventors engaged in intensive studies and reached the conclusion that by just annealing after firing, it is difficult to achieve both reoxidation of the dielectric layers and reduction of end oxidation of the internal electrode layers to reduce capacity variation. This phenomenon tends to become worse in particular the less the interlayer thickness between dielectric layers (the thinner the dielectric layers) and the greater the number of the dielectric layers. Specifically, this is when the interlayer thickness is 5 µm or less and the number of layers is 100 layers or more.

The inventors discovered that to reoxidize the dielectric layers well and reduce end oxidation of the internal electrode layers so as to reduce capacity variation without causing deterioration of the IR temperature dependency in the temperature range intended for use (for example from room temperature to the high temperature region), it is effective to perform the first heat treatment and second heat treatment under specific conditions as a set after the ordinary annealing.

The "IR temperature dependency" is an indicator for viewing how the insulation resistance IR fluctuates with respect to a change in temperature. This IR temperature dependency can be evaluated by calculating the rate by which the IR at a predetermined temperature (for example 150° C.) changes with respect to the IR at a reference temperature (for example, room temperature 20° C.) (rate of change). The smaller the rate of change of IR's between a plurality of temperatures, the better the IR temperature dependency, while the larger, the worse the IR temperature dependency judged.

In the present invention, as the plurality of temperatures, room temperature (20° C.) and a high temperature region (150° C.) may be illustrated. When the insulation resistances at these temperature are designated as $IR_{20}$ and $IR_{150}$, the magnitude of the "IR drop" shown in the following formula 1 is calculated to evaluate the level of the IR temperature dependency:

$$\log(IR_{150}/IR_{20}) \quad \text{formula 1}$$

That is, according to the present invention, after ordinary annealing, the first and second heat treatments are performed under specific conditions. By doing this, it is possible to reduce the capacity variation by reduction of end oxidation of the internal electrode layers without causing deterioration of the IR temperature dependency in the temperature range intended for use (for example from room temperature to a high temperature region) (specifically, able to hold the IR drop shown by the above formula 1 at over −1.50).

The multilayer ceramic electronic device is not particularly limited. A multilayer ceramic capacitor, piezoelectric multiplayer device, chip varistor, chip thermistor, or other surface mounted device (SMD) chip type electronic device may be illustrated.

BRIEF DESCRIPTION OF THE DRAWINGS

Below, the present invention will be explained based on the embodiments shown in the drawings, where.

DESCRIPTION OF THE PREFERRED EMBODIMENTS

In the present embodiment, as the multilayer ceramic electronic device, a multilayer ceramic capacitor may be illustrated. First, the configuration of a multilayer ceramic capacitor will be explained, then a method of production of a multilayer ceramic capacitor will be explained.

Multilayer Ceramic Capacitor

Figure 1:
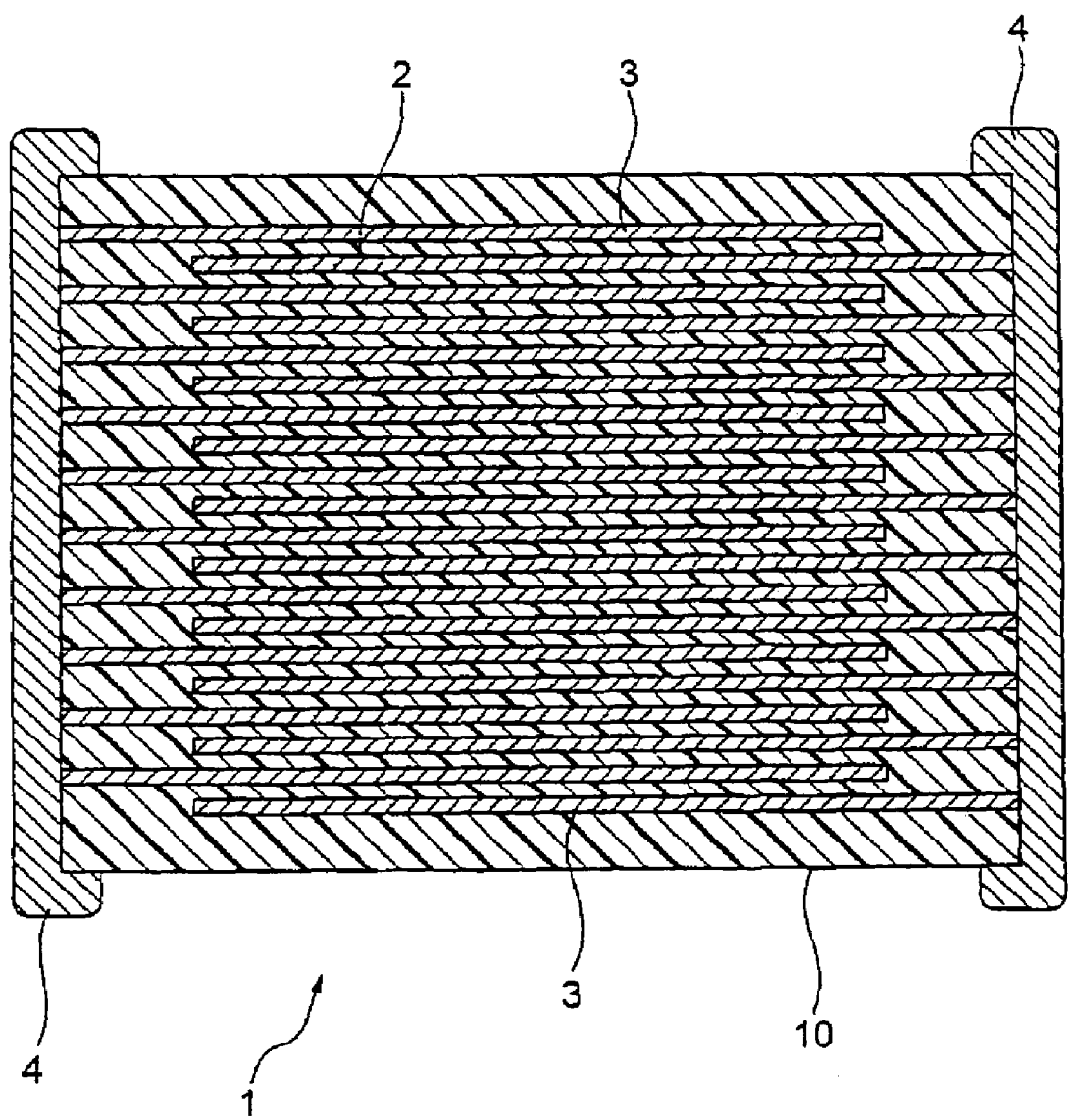
FIG. 1 is a schematic sectional view of a multilayer ceramic capacitor according to an embodiment of the present invention.

As shown in FIG. 1, a multilayer ceramic capacitor 1, one example of a multilayer ceramic electronic device of the present invention, has a capacitor device body 10 comprised of dielectric layers 2 and internal electrode layers 3 alternately stacked. This capacitor device body 10 is formed at its two ends with a pair of external electrodes 4 connected with the internal electrode layers 3 alternately arranged inside the device body 10. The internal electrode layers 3 are stacked so that the two end faces are alternately exposed at the surfaces of the two facing ends of the capacitor device body 10.

The pair of external electrodes 4 are formed at the two ends of the capacitor device body 10 and are connected to the exposed end faces of the alternately arranged internal electrode layers 3 to form a capacitor circuit.

The capacitor device body 10 is not particularly limited in outside shape or dimensions. These can be suitably set in accordance with the application. Normally, the outside shape is substantially a parallelepiped shape. The dimensions may usually be a length of (0.4 to 5.6 mm)×width (0.2 to 5.0 mm)×height (0.2 to 1.9 mm) or so.

The dielectric layer 2 includes a dielectric ceramic composition obtained by the method of the present invention. The dielectric ceramic composition obtained by the present invention method includes barium titanate, a glass ingredient, and an additive ingredient.

Barium titanate is expressed by the formula $(BaO)_m \cdot TiO_2$, wherein in the formula, the mol ratio m is preferably 0.990 to 1.035.

The case where the glass ingredient, in the present embodiment, includes one or both of Ba oxide and Ca oxide and also Si oxide will be illustrated. Preferably, the glass ingredient is expressed by $(Ba_{1-x}Ca_x)SiO_3$ (where, x=0.3 to 0.7).

The additive ingredient, in the present embodiment, includes an Mg oxide, Mn oxide, one type or two types of oxides or more of a V oxide, W oxide, and Mo oxide, and an R (where, R is one type or two types of elements or more selected from Y, Sc, Eu, Gd, Dy, Ho, Er, Tm, Yb, Lu, and Tb, preferably one type or two types of elements or more selected from Y, Dy, and Ho) oxide as an example.

The dielectric layer 2 is reduced in thickness (interlayer thickness) to 5 µm or less, preferably 2 µm or less. In the present embodiment, even if it is possible to reduce the dielectric layer 2 in thickness in this way, there is no effect on the IR temperature dependency. Further, the later explained end oxidation of the internal electrode layers 3 does not occur. As a result, the capacity variation can be reduced. The number of dielectric layers 2 may be suitably determined in accordance with the objective or application, but in the present invention, even if 100 layers or more, preferably 200 layers or more, are stacked, there is no effect on the IR temperature dependency. Further, the later explained end oxidation of the internal electrode layers 3 does not occur. As a result, the capacity variation can be reduced.

The dielectric layer 2 is usually comprised of dielectric particles and a grain boundary phase. The grain boundary phase usually is comprised of an oxide of a material forming the dielectric material or the internal electrode material, an oxide of a material separately added, and an oxide of a material mixed in as an impurity during the process.

The internal electrode layer 3 is substantially comprised of a conductive material of a base metal acting as an electrode. As the base material used as a conductive material, Ni or an Ni alloy is preferable. As an Ni alloy, an alloy of one type of element or more selected from Mn, Cr, Co, Al, Ru, Rh, Ta, Re, Os, Ir, Pt, W, etc. and Ni is preferable. The content of Ni in the alloy is preferably 95 wt % or more. Note that the Ni or Ni alloy may also contain various types of trace ingredients of P, C, Nb, Fe, Cl, B, Li, Na, K, F, S, etc. in an amount of 0.1 wt % or less. In the present embodiment, the internal electrode layers 3 have a thickness of preferably 2.0 μm or less, more preferably 1.4 μm or less.

As the external electrodes 4, normally at least one type of Ni, Pd, Ag, Au, Cu, Pt, Rh, Ru, Ir, etc. or an alloy of the same may be used. Normally, Cu, a Cu alloy, Ni, an Ni alloy, etc., Ag, an Ag—Pd alloy, an In—Ga alloy, etc. may be used. The external electrodes 4 may have a thickness suitably selected in accordance with the application, but usually 10 to 200 μm or so is preferable.

Method of Production of Multilayer Ceramic Capacitor

Next, an example of the method of production of a multilayer ceramic capacitor 1 according to the present embodiment will be explained.

(1) In the present embodiment, a dielectric layer paste for forming the pre-fired dielectric layers for forming the dielectric layers 2 shown in FIG. 1 after firing and an internal electrode layer paste for forming the pre-fired internal electrode layers for forming the internal electrode layers 3 shown in FIG. 1 after firing are prepared. Further, an external electrode paste is also prepared.

The dielectric layer paste is prepared by kneading a dielectric material and an organic vehicle.

(1-1) The dielectric material used in the present embodiment includes the different materials forming the above dielectric ceramic composition in predetermined ratios. For this reason, first, the barium titanate material, glass ingredient material, and additive ingredient material forming the above materials are prepared.

As a barium titanate material, one having a perovskite type crystalline structure expressed by $ABO_3$ and having an A/B value (value of the number of moles of the ingredient forming the A site in the formula $ABO_3$ divided by the number of moles of the ingredient forming the B site) of preferably 0.990 to 1.035, more preferably 0.995 to 1.02, still more preferably 1.000 to 1.009, is used. If the A/B value is too small, grain growth occurs and the high temperature load life (IR life) tends to deteriorate. If the A/B value is too large, the sinterability falls and the firing tends to become difficult. The A/B value can be measured by the glass bead method, fluorescent X-ray analysis method, ICP method, etc. As the ICP (inductively coupled plasma) method, the ICP spectrometry method using an ICP spectrometry system or the ICP mass spectrometry method using an ICP mass spectrometry system may be mentioned.

In the present invention, a barium titanate material having an average particle size of 0.1 to 1.0 μm, preferably 0.1 to 0.5 μm is preferably used. If the average particle size is too small, the dielectric constant ∈ becomes low and the desired capacity cannot be obtained, while conversely if too large, not only does it become difficult to make the dielectric layers 2 thinner, but also the surface of the sheet forming the pre-fired dielectric layers becomes too rough and as a result short-circuit defects increase, the withstand voltage level drops, and other inconveniences occur. As the method of control of the average particle size of the barium titanate material, for example, the solid phase method of crushing the calcined powder after calcining under suitable conditions when trying to obtain the barium titanate material or controlling the temperature or other conditions of the calcining may be mentioned.

The barium titanate material can be obtained by not only the so-called solid phase method, but also the so-called liquid phase method. The solid phase method (calcining method) is the method of obtaining the material by weighing and mixing $BaCO_3$ and $TiO_2$ in predetermined amounts and calcining and crushing the result when using these as starting materials. As the liquid phase method, the oxalate method, hydrothermal synthesis method, alkoxide method, sol gel method, etc. may be mentioned.

As the glass ingredient material, one containing one or both of a Ba compound and Ca compound and an Si compound is used. The Si compound in the glass ingredient material acts as a sintering aid, while the Ca compound and Ba compound have the effect of improving the temperature characteristic of the electrostatic capacity (rate of change of electrostatic capacity with respect to temperature).

The glass ingredient material used in the present embodiment may be in the form of a mixture. Alternatively, it may be used in the form of a compound oxide. However, in the present embodiment, use in the form of a compound oxide where the melting point becomes lower rather than the form of a mixture is preferable.

As the additive ingredient material, an Mg compound, Mn compound, one type or two types of compounds or more selected from a V compound, W compound, and Mo compound, and an R (where, R is one type or two types of elements or more selected from Y, Sc, Eu, Gd, Wy, Ho, Er, Tm, Yb, Lu, and Tb) compound are used.

An Mg compound has the effect of flattening the capacity-temperature characteristic and the effect of suppressing grain growth. An Mn compound has the effect of promoting sintering, the effect of raising the IR (insulation resistance), and the effect of raising the high temperature load life. A V compound, W compound, and Mo compound have the effect of improving the high temperature load life. An R compound mainly has the effect of improving the high temperature load life.

Note that an Mg compound means magnesium oxide and/or a compound giving magnesium oxide after firing, while an Mn compound means manganese oxide and/or a compound giving magnanese oxide after firing. V compound means vanadium oxide and/or a compound giving vanadium oxide after firing, a W compound means tungsten oxide and/or a compound giving tungsten oxide after firing, and a Mo compound means molybdenum oxide and/or a compound giving molybdenum oxide after firing. An R compound means an R oxide and/or a compound giving an R oxide after firing.

(1-2) Next, the barium titanate material, glass ingredient material, and additive ingredient material are mixed to obtain the final composition.

The amount (ratio) of mixture of the glass ingredient material is as follows. When the barium titanate material is converted to $BaTiO_3$, the Ba compound to BaO, the Ca compound to CaO, and the Si compound to $SiO_2$, preferably the Ba compound+Ca compound: 0.1 to 12 mol and the Si compound: 0.1 to 12 mol, more preferably the Ba compound+Ca compound: 0.1 to 6 mol and the Si compound: 0.1 to 6 mol.

If the amount of addition of the Ba compound+Ca compound and the amount of addition of the Si compound are too small, densification at a relatively low temperature is difficult and further the temperature characteristics are adversely affected in some cases.

The amount (ratio) of mixture of the additive ingredient material is as follows. When the barium titanate material is converted to $BaTiO_3$, the Mg compound to MgO, the Mn compound to MnO, the V compound to $V_2O_5$, the W compound to $WO_3$, the Mo compound to MoO, and the R compound to $R_2O_3$, preferably Mg compound: 3 mol or less (however, excluding 0 mol), Mn compound: 0.5 mol or less (however, excluding 0 mol), V compound+W compound+Mo compound: 0.3 mol or less (however, excluding 0 mol), R compound: 0.02 to 5 mol.

More preferably, Mg compound: 0.1 to 2.5 mol, Mn compound: 0.25 mol or less (however, excluding 0 mol), V compound+W compound+Mo compound: 0.01 to 0.1 mol, and R compound: 1 to 3.5 mol.

If the amount of addition of the Mg compound is too small, abnormal grain growth tends to occur, while if too large, the dielectric constant tends to fall. If the amount of addition of the Mn compound is too great, the dielectric constant tends to fall. If the total amount of addition of the V compound, W compound, and Mo compound is too great, the IR tends to remarkably fall. If the amount of addition of the R compound is too large, the sinterability tends to deteriorate.

Then, this mixed powder may, in accordance with need, be mixed by a ball mill etc. together with pure water or another dispersion medium and dried to obtain the dielectric material.

Note that as the dielectric material comprised of the above ingredient, the above-mentioned oxides or their mixtures and compound oxides may be used, but in addition various types of compounds giving the above oxides or compound oxides by firing, for example, carbonates, oxalates, nitrates, hydroxides, organometallic compounds, etc. may be suitably selected and mixed for use.

Note that the contents of the different materials in the compounds of the dielectric material may be suitably selected so as to give the above dielectric ceramic composition after firing.

The organic vehicle contains a binder and solvent. As the binder, for example, ethyl cellulose, polyvinyl butyral, acryl resin, or other usual types of binder may be used. The solvent is also not particularly limited, but terpineol, butyl carbitol, acetone, toluene, xylene, ethanol, or another organic solvent may be used.

The dielectric layer paste can be formed by kneading a dielectric material and a vehicle comprised of water in which a water-soluble binder is dissolved. The water-soluble binder is not particularly limited, but a polyvinyl alcohol, methyl cellulose, hydroxyethyl cellulose, water-soluble acryl resin, emulsion, etc. may be used.

The internal electrode layer paste is prepared by kneading the above various types of conductive metals or alloys forming the conductive material or the various types of oxides, organometallic compounds, resinates, etc. forming the conductive material after firing and the above organic vehicle.

The external electrode paste is also prepared in the same way as this internal electrode layer paste.

The content of the organic vehicle of each paste is not particularly limited, but the usual content should be, for example, a binder of about 1 to 5 wt % and a solvent of about 10 to 50 wt %. Further, each paste may contain in accordance with need various types of additives selected from dispersants, plasticizers, dielectrics, insulators, etc.

(2) Next, the dielectric layer paste and internal electrode layer paste are used to prepare a green chip comprised of pre-fired dielectric layers and pre-fired internal electrode layers.

When using the printing method, the dielectric layer paste and predetermined patterns of internal electrode layer paste are printed overlapping on a carrier sheet, cut to a predetermined shape, then peeled from the carrier sheet to form a green chip. When using the sheet method, the dielectric layer paste is formed on the carrier sheet to a predetermined thickness to obtain a green sheet, then the internal electrode layer paste is printed on it in predetermined patterns, then these are stacked to form a green chip.

(3) Next, the obtained green chip is treated to remove the binder.

The binder removal is a process of raising the atmosphere temperature from for example room temperature (20° C.) toward the binder removal holding temperature by a predetermined rate of temperature rise, holding it at the holding temperature for a predetermined time, then lowering it by a predetermined rate of temperature reduction. This may be conducted under normal conditions.

(4) Next, the binder-free green chip is fired.

Figure 2:
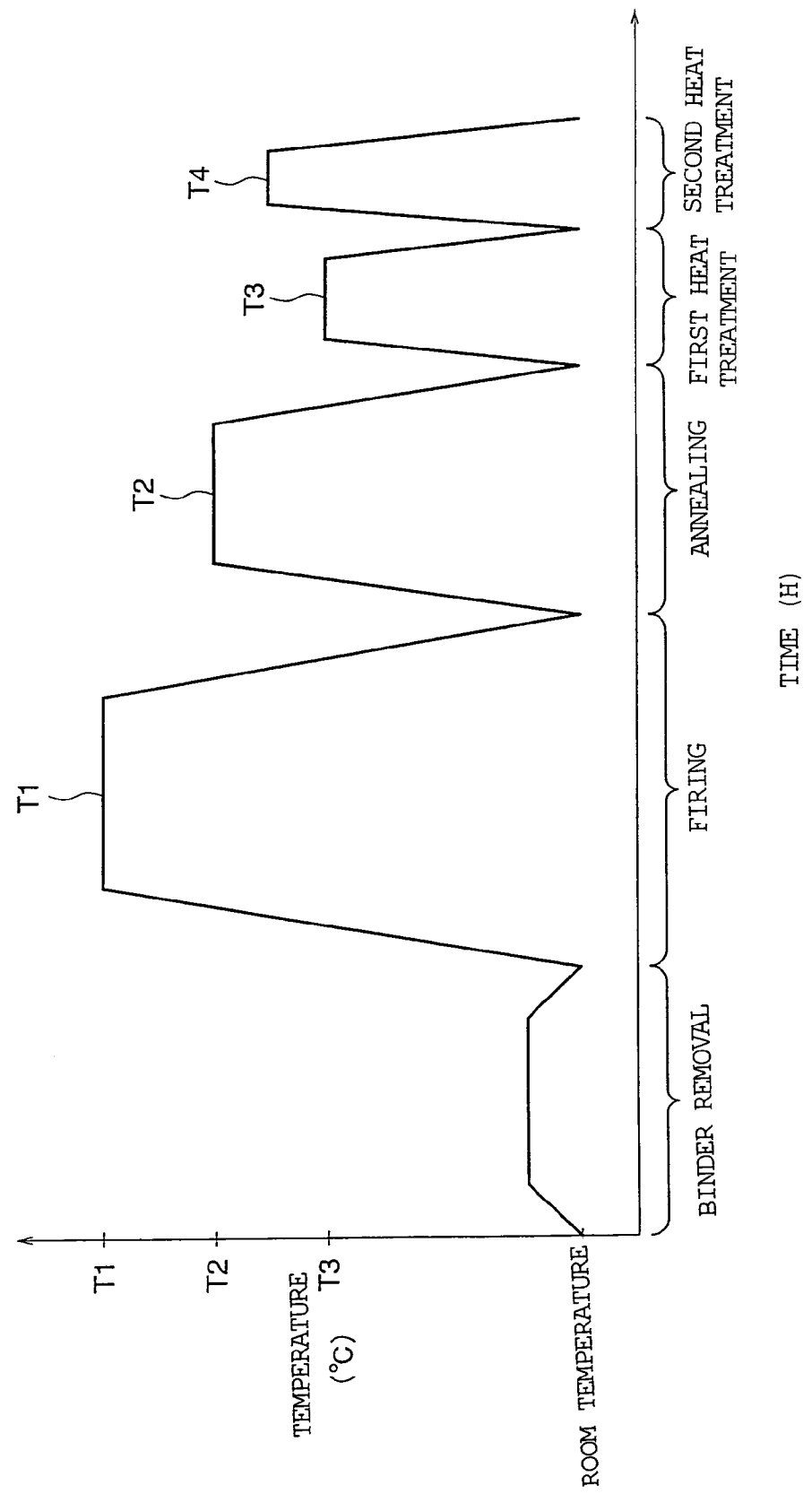
FIG. 2 is a graph of the change in temperatures of the firing, annealing, first heat treatment, and second heat treatment in the examples of the present invention.

The firing is a process of raising the atmosphere temperature T0, as shown in for example FIG. 2, for example, from room temperature (20° C.) toward the firing holding temperature T1 by a predetermined rate of temperature rise, holding it at the T1 for a predetermined time, then lowering it by a predetermined rate of temperature reduction.

In the present embodiment, the rate of temperature rise is preferably 50 to 500° C./hour, more preferably 100 to 300° C./hour. The firing holding temperature T1 is preferably 1180 to 1350° C., more preferably 1200 to 1280° C., while the T1 holding time is preferably 0.5 to 8 hours, more preferably 1 to 3 hours. If T1 is too low, even if the T1 holding time is lengthened, densification becomes insufficient, while if T1 is too high, breakage of the electrodes due to abnormal sintering of the internal electrode layers, deterioration of the capacity-temperature characteristic due to diffusion of the conductive material forming the internal electrode layers, and reduction of the dielectric ceramic composition forming the dielectric layers easily occur. The rate of temperature reduction is preferably 50 to 500° C./hour, more preferably 200 to 300° C./hour.

The firing atmosphere is a reducing atmosphere. As the atmosphere gas in the reducing atmosphere, for example, a mixed gas comprised of a wet $N_2$ gas to which a dry $N_2$ gas is mixed and to which an $H_2$ gas is mixed, a mixed gas comprised of a wet $N_2$ gas to which an $H_2$ gas is mixed, etc. is preferably used. In particular, at the time of firing, raising the temperature up to the holding temperature at the time of binder removal under an $N_2$ gas or wet $N_2$ gas atmosphere, then changing the atmosphere and further raising the temperature is preferable. After cooling down to the later mentioned annealing holding temperature T2, again changing to an $N_2$ gas or wet $N_2$ gas atmosphere and continuing cooling is preferable.

The firing atmosphere has an oxygen partial pressure ($PO_2$) P1 of preferably $10^{-12}$ to $10^{-4}$ Pa, more preferably $10^{-8}$ to $10^{-5}$ Pa. If P1 is too low, the conductive material of the internal electrode layers undergoes abnormal sintering and ends up breaking in some cases, while if P1 is too high, the internal electrode layers tend to oxidize.

(5) Next, the fired chip sintered body is annealed.

The annealing is treatment for reoxidation of the dielectric layers. Due to this, the insulation resistance can be increased.

The annealing is a process of raising the atmosphere temperature T0, for example as shown in FIG. 2, from for example room temperature (20° C.) toward the annealing holding temperature T2 at a predetermined rate of temperature rise, holding it at T2 for a predetermined time, then lowering it at a predetermined rate of temperature reduction.

In the present embodiment, the rate of temperature rise is preferably 50 to 500° C./hour, more preferably 100 to 300° C./hour.

The annealing holding temperature T2 is preferably 950 to 1100° C., more preferably 1000 to 1100° C., while the T2 holding time is preferably 6 hours or less, more preferably 2 to 5 hours. If T2 is too low, the obtained capacitor tends to deteriorate in accelerated life of the insulation resistance (high temperature load life) and fall in reliability, while if too high, the obtained capacitor tends to suffer from conduction defects, and the internal electrode layers 3 easily suffer from end oxidation. The rate of temperature reduction is preferably 50 to 500° C./hour, more preferably 100 to 300° C./hour.

The annealing atmosphere is preferably a neutral atmosphere. As the atmosphere gas in the neutral atmosphere, for example, a mixed gas of wet $N_2$ gas into which dry $N_2$ gas is mixed, wet $N_2$ gas, etc. is preferably used. At the time of annealing, it is possible to raise the atmosphere temperature T0 under an $N_2$ gas atmosphere to T2, then change the atmosphere or conduct the entire annealing step in a wet $N_2$ gas atmosphere.

The oxygen partial pressure ($PO_2$) P2 in the annealing atmosphere is preferably $10^{-3}$ to 1 Pa, more preferably $10^{-2}$ to 1 Pa. If P2 is too low, the capacitor life deteriorates, while if P2 is too high, the capacitor is liable to become defective in conduction.

(6) Next, the annealed chip sintered body is heat treated.

The present invention is characterized in the point of performing the later explained second heat treatment after the annealing and after the first heat treatment under specific conditions.

The first heat treatment is a step of raising the atmosphere temperature T0, for example as shown in FIG. 2, from for example room temperature (20° C.) toward the heat treatment holding temperature T3 by a predetermined rate of temperature rise, holding the temperature at the T3 for a predetermined time, then lowering the temperature by a predetermined rate of temperature reduction.

In the present embodiment, the rate of temperature rise is preferably 50 to 1000° C./hour, more preferably 200 to 1000° C./hour. If faster than this, the effect of reduction of capacity variation by reduction of end oxidation becomes smaller, while if too slow, the dielectric layers 2 are liable to be damaged.

When assuming the later explained strong reducing atmosphere of the oxygen partial pressure P3, in the present invention, the first heat treatment holding temperature T3 is made over 300° C. to less than 600° C., preferably 400 to 550° C. If T3 is too low or too high, even if performing the later explained second heat treatment, it is not possible to reduce capacity variation without causing deterioration of the IR temperature dependency.

Said T3 holding time is preferably 10 hours or less, more preferably 0 to 5 hours. That is, 0 hour is also possible. Even if holding the holding temperature T3 for zero hour, that is, simultaneously reducing the temperature when the highest temperature is reached, the effect of the present invention is obtained. The rate of temperature reduction is preferably 50 to 1000° C./hour, more preferably 200 to 1000° C./hour.

The treatment atmosphere of the first heat treatment is a strong reducing atmosphere. As the atmosphere gas in the strong reducing atmosphere, for example, a mixed gas of wet $N_2$ gas and dry $N_2$ gas and $H_2$ gas is preferably used. This $N_{2+}H_2$ mixed gas may be obtained by mixing dry $N_2$ gas with wet $N_2$ gas and further mixing in 0.1 to 9 vol % of $H_2$ gas.

At the time of the first heat treatment, it is also possible to raise the atmosphere temperature T0 under an $N_2$ gas atmosphere to T3, then change the atmosphere or perform the entire process of the heat treatment under a mixed gas atmosphere of a wet $N_2$ gas and dry $N_2$ gas and $H_2$ gas.

When assuming the holding temperature T3, in the present invention, the oxygen partial pressure ($PO_2$) P3 in the heat treatment atmosphere is made over $2.9 \times 10^{-39}$ Pa to less than $6.7 \times 10^{-24}$ Pa, preferably $1.3 \times 10^{-32}$ to $1.1 \times 10^{-25}$ Pa. If P3 is too low or too high, even if performing the later explained second heat treatment, it is not possible to reduce capacity variation without causing deterioration of the IR temperature dependency.

(7) Next, the chip sintered body after the first heat treatment is treated by second heat treatment. Due to this second heat treatment, a capacitor device body 10 comprised of a sintered body is formed.

By performing the second heat treatment after the above first heat treatment, there is no deterioration in the IR temperature dependency in the temperature range intended for use (for example, from room temperature (20° C.) to the high temperature region (150° C.)). Specifically, for example, when designating the insulation resistances at the temperatures of room temperature (20° C.) and the high temperature region (150° C.) as $IR_{20}$ and $IR_{150}$, it is possible to make the "IR drop" shown by the following formula 1 over −1.50, preferably −1.40 or more. That is, the IR temperature dependency can be reduced.

$$\log(IR_{150}/IR_{20}) \qquad \text{formula 1}$$

In addition to this, it is possible to reduce capacity variation by reduction of the end oxidation of the internal electrode layers.

That is, by performing the above first heat treatment and second heat treatment as a set, it is possible to reduce capacity variation without causing deterioration of the IR temperature dependency.

The second heat treatment is a step of raising the atmosphere temperature T0, as shown in for example FIG. 2, from for example room temperature (20° C.) toward the second heat treatment holding temperature T4 by a predetermined rate of temperature rise, holding it at T4 for a predetermined time, then lowering it by a predetermined rate of temperature reduction.

In the present embodiment, the rate of temperature rise is preferably 50 to 1000° C./hour, more preferably 200 to 1000° C./hour. If too fast, there is less effect of reduction of capacity variation by reduction of the end oxidation, while if too slow, the dielectric layers 2 are liable to be damaged.

When assuming an atmosphere of the later explained oxygen partial pressure P4, in the present invention, the second heat treatment holding temperature T4 is made over 500° C. and less than 1000° C., preferably 600 to 900° C. If T4 is too low or too high, it is impossible to reduce capacity variation of the final capacitor 1 without causing deterioration of the IR temperature dependency.

The T4 holding time is preferably 10 hours or less, more preferably 0 to 5 hours. That is, it may also be 0 hour. Even if holding the holding temperature T3 for zero hour, that is, lowering the temperature simultaneously with reaching the highest temperature, the effect of the present invention is obtained. The rate of temperature reduction is preferably 50 to 1000° C./hour, more preferably 200 to 1000° C./hour.

The treatment atmosphere of the second heat treatment is preferably a neutral atmosphere. As the atmosphere gas in the neutral atmosphere, for example, a mixed gas of wet $N_2$ gas with which dry $N_2$ gas is mixed, wet $N_2$gas, etc. is preferably used. At the time of the second heat treatment, the atmosphere temperature T0 may be raised under an $N_2$ gas atmosphere up to T4, then the atmosphere changed or the entire process of the second heat treatment may be performed under a wet $N_2$ gas atmosphere.

When assuming the holding temperature T4, in the present invention, the oxygen partial pressure ($PO_2$) P4 in the second heat treatment atmosphere is made over $1.9 \times 10^{-7}$ Pa and less than $4.1 \times 10^{-3}$ Pa, preferably $3.5 \times 10^{-6}$ to $1.1 \times 10^{-3}$ Pa. If P4 is too low or too high, it is not possible to reduce capacity variation without causing deterioration of the IR temperature dependency.

Note that the above annealing, first heat treatment, and/or second heat treatment may also be comprised of just a temperature raising process and a temperature lowering process. That is, it is also possible to make the temperature holding time zero and not provide the temperature holding step. In this case, the annealing holding temperature T2, first heat treatment holding temperature T3, and second heat treatment holding temperature T4 are synonymous with the highest temperature.

In the above mentioned treatment to remove the binder, firing, annealing, and heat treatment, the $N_2$ gas or the mixed gas etc. may be wet by using for example a wetter etc. In this case, a water temperature of 0 to 75° C. or so is preferable.

(8) Next, the obtained capacitor device body 10 is printed with or transferred with external electrode paste which is then fired to form external electrodes 4. Due to this, a multilayer ceramic capacitor 1 is obtained. The firing conditions of the external electrode paste are preferably for example firing in a mixed gas of wet $N_2$ and $H_2$ at 600 to 800° C. for 10 minutes to 1 hour or so. Further, in accordance with need, the surfaces of the external electrodes 4 are formed with coating layers by plating etc.

The produced multilayer ceramic capacitor 1 is mounted by soldering etc. on a printed circuit board etc. and used for various types of electronic equipment etc.

In the present embodiment, the annealed stack was treated by first heat treatment under a strong reducing atmosphere of a predetermined range of oxygen partial pressure P3 in a predetermined range of holding temperature T3. Next, the stack after the first heat treatment was treated by second heat treatment under an atmosphere of a predetermined range of oxygen partial pressure P4 in a predetermined range of holding temperature T4. By performing the first heat treatment and second heat treatment as a set in this way, even in a case where the interlayer thickness of the dielectric layers before firing is 5 μm or less and the number of layers is 100 layers or more, that is, with progress in reducing the thickness of layers and increasing the number of layers, it is possible to reduce capacity variation of the final capacitor 1 by reduction of the end oxidation of the internal electrode layers without causing deterioration of the IR temperature dependency in the temperature range intended for use (for example, from room temperature to the high temperature region).

Above, embodiments of the present invention were explained, but the present invention is not limited to these embodiments in any way. The invention may be worked in various forms within a range not outside the gist of the present invention needless to say.

For example, in the above embodiments, as the multilayer ceramic electronic device, a multilayer ceramic capacitor 1 was illustrated, but the present invention is not limited to this.

Further, in the above embodiments, the treatment for removal of the binder, firing, annealing, first heat treatment, and second heat treatment were performed independently, but the present invention is not limited to this. Two or more steps may be performed consecutively. When performing them consecutively, preferably, after the treatment to remove the binder, it is possible to change the atmosphere without cooling, then raise the temperature to T1 for firing, then cool and, when reaching T2, change the atmosphere for annealing, then cool and, when reaching T3, change the atmosphere and perform the first heat treatment, then change the atmosphere and, while doing so, raise the temperature to T4 to perform the second heat treatment.

EXAMPLES

Next, examples further embodying the embodiments of the present invention will be given to explain the present invention in further detail. However, the present invention is not limited to these examples.

Example 1

Preparation of Dielectric Material

First, the barium titanate material, glass ingredient material, and additive ingredient material were prepared.

As the barium titanate material, $BaTiO_3$ with an average crystal grain size of 0.35 μm was used.

As the glass ingredient material, BaO, CaO, and $SiO_2$ were used.

As the additive ingredient material, MgO, MnO, $Y_2O_3$, and $V_2O_5$ of an average particle size of 0.01 to 0.1 μm were used.

Next, to 100 mol of the barium titanate material, the glass ingredient material constituted by BCG and the additive ingredient material constituted by MgO, MnO, $Y_2O_3$, and $V_2O_5$ were added. These were wet mixed using water as a solvent by a ball mill for 16 hours (water crushing). Then, hot air was blown for drying at 130° C. to obtain a dielectric material.

The dielectric material contained, with respect to 100 mol of the barium titanate material, BaO and CaO in amounts of 4 mol each, $SiO_2$ in an amount of 4 mol, MgO in an amount of 1 mol, MnO in an amount of 0.4 mol, $Y_2O_3$ in an amount of 1 mol, and $V_2O_5$ in an amount of 0.01 mol.

Preparation and Evaluation of Sintered Body

The obtained dielectric material had a polyvinyl butyral resin and ethanol-based organic solvent added to it, then these were again mixed by a ball mill to prepare a paste so as to obtain a dielectric layer paste.

Next, Ni particles in an amount of 44.6 parts by weight, terpineol in 52 parts by weight, ethyl cellulose in 3 parts by weight, and benzotriazole in 0.4 part by weight were kneaded by a triple roll to prepare a slurry and obtain an internal electrode paste.

Next, the dielectric layer paste was coated by the doctor blade method on a PET film to a thickness of 3 μm to form a green sheet. This was printed with an internal electrode layer paste in predetermined patterns, then the green sheet was peeled off the PET film.

Next, green sheets and protective green sheets (ones not printed with internal electrode layer paste) were stacked and pressed to obtain a green chip. The number of layers of the sheets having internal electrodes was made 350.

Next, the obtained green chip was cut to a predetermined size and was stripped of the binder, fired, annealed, and heat treated under the conditions shown below to obtain a sintered body.

Binder Removal

Rate of temperature rise: 25° C./hour,
Holding temperature: 260° C.,
Holding time: 8 hours,
Atmosphere: air,
Rate of temperature reduction: 300° C./hour,
Temperature lowered to: room temperature (20° C.).

Firing

Rate of temperature rise: 200° C./hour,
Holding temperature T1: 1255° C.,
Holding time: 2 hours,
Atmosphere: reducing,
Atmosphere gas: mixed gas of wet $N_2$ gas (condensation point: 20° C.) and dry $N_2$ gas and $H_2$ gas (5 vol %), Oxygen partial pressure P1: 4.3×10⁻⁷ Pa,
Rate of temperature reduction: 200° C./hour,
Temperature lowered to: room temperature (20° C.).
   Annealing
Rate of temperature rise: 200° C./hour,
Holding temperature T2: 1050° C.,
Holding time: 2 hours,
Atmosphere: neutral,
Atmosphere gas: mixed gas of wet $N_2$ gas (condensation point: 20° C.) and dry $N_2$ gas,
Oxygen partial pressure P2: 1.3×10⁻¹ Pa,
Rate of temperature reduction: 200° C./hour,
Temperature lowered to: room temperature (20° C.).
   First Heat Treatment
Rate of temperature rise: 500° C./hour,
Holding temperature T3: see tables,
Temperature holding time: 2 hours,
Atmosphere: strong reducing
Atmosphere gas: mixed gas of wet $N_2$ gas (condensation point: 20° C.) and dry $N_2$ gas and $H_2$ gas,
Oxygen partial pressure P3: see tables,
Rate of temperature reduction: 500° C./hour,
Temperature lowered to: room temperature (20° C.).
   Second Heat Treatment
Rate of temperature rise: 500° C./hour,
Holding temperature T4: see tables,
Temperature holding time: 0 hours,
Atmosphere: neutral,
Atmosphere gas: mixed gas of wet $N_2$ gas (condensation point: 20° C.) and dry $N_2$ gas,
Oxygen partial pressure P4: see tables,
Rate of temperature reduction: 500° C./hour,
Temperature lowered to: room temperature (20° C.).

Note that the $N_2$ gas is wet at the time of the firing, annealing, first heat treatment, and second heat treatment using a wetter of a water temperature of 45° C.

The oxygen partial pressure P1, P3 at the time of the firing and first heat treatment is the value calculated by arranging a condensation point meter at the outlet of the oven and measuring the concentration of the $H_2$ introduced into the oven and the condensation point of the gas exhausted. The oxygen partial pressure P2 at the time of annealing and the oxygen partial pressure P4 at the time of the second heat treatment are values calculated by the condensation point, $H_2$ concentration, and temperature.

The obtained sintered body had a size of the 2012 shape (length: 2.0 mm×width: 1.2 mm×height: 1.9 mm)). The number of the dielectric layers sandwiched between two internal electrode layers (number of layers) was 350, the thickness (=interlayer thickness) was about 2 μm, and the thickness of the internal electrode layer was 1.2 μm.

Preparation and Properties of Capacitor Sample

The end faces of the obtained sintered body were coated/baked with Cu paste as external electrodes to obtain the multilayer ceramic capacitor sample of FIG. 1.

Capacity Variation

Thirty obtained capacitor samples of the same lot were measured for electrostatic capacity C at a reference temperature of 20° C. by a digital LCR meter (made by Yokogawa Electric: YHP4284) under conditions of a frequency of 1 kHz and an input signal level (measurement voltage) of 1 Vrms/μm. The capacity variation was calculated as 3σ/x (where x is the average of 30). When the value of (3σ/x) was 15 or less, there was little capacity variation and the result was judged good.

IR Temperature Dependency (Drop)

The IR temperature dependency (drop) was evaluated by measuring the insulation resistance $IR_{150}$ at a high temperature (150° C.) and the insulation resistance $IR_{20}$ at room temperature (20° C.) of the obtained sample and calculating the drop shown in the following formula 1. The evaluation criteria was a good one of over −1.50.

$$\log(IR_{150}/IR_{20}) \quad \text{formula 1}$$

The insulation resistance at the different temperatures was measured using a variable temperature IR measuring device at a measurement voltage of 6.3V and a voltage application time of 60 seconds.

The results are shown in the tables. The indications "~E−n" at the oxygen partial pressures in the tables mean "~×10⁻ⁿ".

TABLE 1

| | First heat treatment | | | | Second heat treatment | | | |
|---|---|---|---|---|---|---|---|---|
| | | Oxygen | Capacitor sample | | | Oxygen | Capacitor sample | |
| Sample no. | Holding temp. T3 (° C.) | partial pressure P3 (Pa) | Capacity variation C3σ/x | IR temp. dependency | Holding temp. T4 (° C.) | partial pressure P4 (Pa) | Capacity variation C3σ/x | IR temp. dependency |
| 1 | — | — | 72.4 | 1.17 | — | — | 72.4 | 1.17 |
| 2 | — | — | 72.4 | 1.17 | 750 | 9.5E−05 Pa | 130.0 | 1.22 |
| 3 | 300 | 2.9E−39 | 65.2 | 1.15 | 750 | 9.5E−05 Pa | 18.7 | 1.20 |
| 4 | 400 | 1.3E−32 | 57.3 | 1.15 | 750 | 9.5E−05 Pa | 7.8 | 1.20 |
| 5 | 450 | 5.5E−30 | 28.6 | 1.18 | 750 | 9.5E−05 Pa | 5.8 | 1.22 |
| 6 | 500 | 1.1E−27 | 19.2 | 1.22 | 750 | 9.5E−05 Pa | 6.3 | 1.27 |
| 7 | 550 | 1.1E−25 | 15.2 | 1.27 | 750 | 9.5E−05 Pa | 4.8 | 1.48 |
| 8 | 600 | 6.7E−24 | 6.2 | 1.56 | 750 | 9.5E−05 Pa | 5.2 | 1.97 |

Firing: Holding temperature T1 = 1255° C., oxygen partial pressure P1 = 4.3E−07 Pa
Annealing: Holding temperature T2 = 1050° C., oxygen partial pressure P2 = 1.3E−01 Pa
First heat treatment: T3 holding time = 2 h, $H_2$ concentration in atmosphere = 5%
Second heat treatment: T4 holding time = 0 h
Sintered body: Number of dielectric layers stacked = 350, interlayer thickness = 2 μm From Table 1, the following will be understood. First, look at only the first heat treatment. If no heat treatment is performed after the annealing (Samples 1, 2), the IR temperature dependency does not degrade, but the end oxidation of the internal electrode layers is not reduced, so capacity variation occurs. As the oxygen partial pressure P3 and holding temperature T3 become higher, the end oxidation of the internal electrode layers is reduced. As a result, the capacity variation of the capacitor samples tends to be reduced (Samples 3 to 8), P3 and T3 is too high (Sample 8), and the IR temperature dependency tends to deteriorate. That is, by just the first heat treatment after annealing, it is learned that obtaining both reduction of the capacity variation and IR temperature dependency of the capacitor samples is difficult. As opposed to this, after the first heat treatment, the second heat treatment is performed, whereby it was confirmed that it is possible to reduce the capacity variation of the capacitor samples without causing deterioration of the IR temperature dependency.

Next, when assuming that the second heat treatment is performed under conditions of a holding temperature T4 of 750° C. and an oxygen partial pressure P4 of $9.5 \times 10^{-5}$ Pa, if not performing the first heat treatment after annealing (Sample 2) or if the oxygen partial pressure P3 and holding temperature T3 at the first heat treatment are too low, (Sample 3), even if performing the second heat treatment after this, it is not possible to reduce the capacity variation of the capacitor samples without causing deterioration of the IR temperature dependency. The same is true even if P3 and T3 are too high (Sample 8).

As opposed to this, when P3 and T3 are controlled to suitable ranges, it is recognized that it is possible to reduce the capacity variation of the capacitor sample without causing deterioration of the IR temperature dependency (Samples 4 to 7).

Example 2

Except for changing the T3 holding time of the first heat treatment and the T4 holding time of the second heat treatment from zero (no keep) to 24 hours, a capacitor sample was prepared and evaluated under the same conditions as Sample 5 shown in Table 1 of Example 1. As a result, similar results are obtained.

Example 3

Except for changing the rate of temperature rise of the first heat treatment and the rate of temperature rise of the second heat treatment 300° C./hour and 1000° C./hour, a capacitor-sample was prepared and evaluated under the same conditions as Sample 5 shown in Table 1 of Example 1. As a result, similar results are obtained as with the case of a rate of temperature rise of 500° C./hour.

Reference Example 1

Except for changing the interlayer thickness and the number of layers of the dielectric layers, the same procedure was followed as with Sample 1 shown in Table 1 of Example 1 to prepare a sintered body and measure capacity variation. The results are shown in Table 3.

TABLE 2

| | First heat treatment | | Capacitor sample | | Second heat treatment | | Capacitor sample | |
|---|---|---|---|---|---|---|---|---|
| Sample no. | Holding temp. T3 (° C.) | Oxygen partial pressure P3 (Pa) | Capacity variation C3σ/x | IR temp. dependency | Holding temp. T4 (° C.) | Oxygen partial pressure P4 (Pa) | Capacity variation C3σ/x | IR temp. dependency |
| 11 | 450 | 5.5E−30 | 28.6 | 1.18 | — | — | 28.6 | 1.18 |
| 12 | 450 | 5.5E−30 | 28.6 | 1.18 | 500 | 1.9E−07 Pa | 17.9 | 1.19 |
| 13 | 450 | 5.5E−30 | 28.6 | 1.18 | 600 | 3.5E−06 Pa | 12.4 | 1.27 |
| 5 | 450 | 5.5E−30 | 28.6 | 1.18 | 750 | 9.5E−05 Pa | 5.8 | 1.22 |
| 14 | 450 | 5.5E−30 | 28.6 | 1.18 | 900 | 1.1E−03 Pa | 4.9 | 1.45 |
| 15 | 450 | 5.5E−30 | 28.6 | 1.18 | 1000 | 4.1E−03 Pa | 6.8 | 1.78 |

Firing: Holding temperature T1 = 1255° C., oxygen partial pressure P1 = 4.3E−07 Pa
Annealing: Holding temperature T2 = 1050° C., oxygen partial pressure P2 = 1.3E−01 Pa
First heat treatment: T3 holding time = 2 h, $H_2$ concentration in atmosphere = 5%
Second heat treatment: T4 holding time = 0 h
Sintered body: Number of dielectric layers stacked = 350, interlayer thickness = 2 μm From Table 2, the following will be understood. When assuming that the first heat treatment is performed under conditions of a holding temperature T3 of 450° C. and an oxygen partial pressure P3 of $5.5 \times 10^{-30}$ Pa, if the second heat treatment after the first heat treatment is not performed (Sample 11) or if the oxygen partial pressure P4 and holding temperature T4 at the second heat treatment are too low (Sample 12), it is not possible to reduce the capacity variation of the capacitor sample without causing deterioration of the IR temperature dependency. The same is true when the P4 and T4 are too high (sample 15).

As opposed to this, when P4 and T4 are controlled in suitable ranges, it is possible to reduce the capacity variation of the capacitor sample without causing deterioration of the IR temperature dependency (Samples 5 and 12 to 14).

TABLE 3

| | Sintered body Dielectric layer | | Capacitor sample |
|---|---|---|---|
| Sample no. | No. of stacked layers | Interlayer thickness (μm) | Capacity variation C3σ/x |
| 21 | 43 | 24.2 | 10.5 |
| 22 | 91 | 10.9 | 13.8 |
| 23 | 186 | 4.7 | 23.5 |
| 1 | 350 | 2 | 72.4 |

Firing: Holding temperature T1 = 1255° C., oxygen partial pressure P1 = 4.3E−07 Pa
Annealing: Holding temperature T2 = 1050° C., oxygen partial pressure P2 = 1.3E−01 Pa
First heat treatment: None
Second heat treatment: None As shown in Table 3, it is understood that by making the interlayer thickness of the dielectric layers thinner or increasing the number of layers of the dielectric layers, end oxidation of the internal electrode layers progresses and as a result capacity variation tends to become worse (Samples 1 and 21 to 23). In particular, when making the interlayer thickness of the dielectric layers 5 μm or less or making the number of dielectric layers 100 or more, if not performing the first to second heat treatments of Example 1 after annealing, the end oxidation of the internal electrode layers becomes worse, so it could be confirmed that the value of capacity variation as $3\sigma/x$ ended up exceeding 15 (Samples 1, 23).

The invention claimed is:

1. A method of production of a multilayer ceramic electronic device having dielectric layers with an interlayer thickness of 5 μm or less after firing and internal electrode layers including a base metal, comprising:
   a step of preparing a stack comprised of 100 layers or more of alternate dielectric layer paste and internal electrode layer paste a base metal,
   a step of firing, then annealing the stack under a reducing atmosphere,
   a step of first heat treatment of said annealed stack under a strong reducing atmosphere of an oxygen partial pressure P3 of over $2.9 \times 10^{-39}$ Pa to less than $6.7 \times 10^{-24}$ Pa and a holding temperature T3 of over 300° C. to less than 600° C., and then followed by
   a step of second heat treatment of said first heat treated stack under an atmosphere of an oxygen partial pressure P4 of over $1.9 \times 10^{-7}$ Pa to less than $4.1 \times 10^{-3}$ Pa and a holding temperature T4 of over 500° C. to less than 1000° C., wherein
   said dielectric layer paste has a barium titanate material having an average particle size of 0.1 to 1.0 μm, a glass ingredient material, and an additive ingredient material;
   said glass ingredient material has a Ba compound and/or Ca compound and Si compound; and
   said additive ingredient material has
   an Mg compound,
   an Mn compound,
   one type or two types of compounds or more selected from a V compound, W compound and Mo compound, and
   an R compound is one or more types of elements selected from Y, Sc, Eu, Gd, Dy, Ho, Er, Tm, Yb, Lu, and Tb
   when the barium titanate material is converted to $BaTiO_3$, the Ba compound to BaO, the Ca compound to CaO, the Si compound to $SiO_2$, the Mg compound to MgO, the Mn compound to MnO, the V compound to $V_2O_5$, the W compound to $WO_3$, the Mo compound to MoO, and the R compound to $R_2O_3$,
   the ratio to $BaTiO_3$: 100 mol is
   Ba compound+Ca compound: 0.1 to 12 mol,
   Si compound: 0.1 to 12 mol,
   Mg compound: 3 mol or less, excluding 0 mol,
   Mn compound: 0.5 mol or less, excluding 0 mol,
   V compound+W compound+Mo compound: 0.3 mol or less, excluding 0 mol,
   R compound: 0.02 to 5 mol.

2. The method of production of a multilayer ceramic electronic device as set forth in claim 1, wherein in the first and second heat treatment,
   said partial pressure P3 is $1.3 \times 10^{-32}$ to $1.1 \times 10^{-25}$ Pa,
   said temperature T3 is 400 to 550° C.,
   said partial pressure P4 is $3.5 \times 10^{-6}$ to $1.1 \times 10^{-3}$ Pa, and
   said temperature T4 is 600 to 900° C.,
   said dielectric layer paste has a barium titanate material having an average particle size of 0.1 to 1.0 μm, a glass ingredient material, and an additive ingredient material;
   said glass ingredient material has a Ba compound and/or Ca compound and Si compound; and
   said additive ingredient material has
   an Mg compound,
   an Mn compound,
   one type or two types of compounds or more selected from a V compound, W compound and Mo compound, and
   an R compound is one or more types of elements selected from Y, Sc, Eu, Gd, Dy, Ho, Er, Tm, Yb, Lu, and Tb
   when the barium titanate material is converted to $BaTiO_3$, the Ba compound to BaO, the Ca compound to CaO, the Si compound to $SiO_2$, the Mg compound to MgO, the Mn compound to MnO, the V compound to $V_2O_5$, the W compound to $WO_3$, the Mo compound to MoO, and the R compound to $R_2O_3$,
   the ratio to $BaTiO_3$: 100 mol is
   Ba compound+Ca compound: 0.1 to 12 mol,
   Si compound: 0.1 to 12 mol,
   Mg compound: 3 mol or less, excluding 0 mol,
   Mn compound: 0.5 mol or less, excluding 0 mol,
   V compound+W compound+Mo compound: 0.3 mol or less, excluding 0 mol,
   R compound: 0.02 to 5 mol.

3. The method of production of the multilayer ceramic electronic device as set forth in claim 2, wherein a mixed gas of a wet $N_2$ gas and a dry $N_2$ gas and $H_2$ gas is used to adjust the P3 and P4.

4. The method of production of the multilayer ceramic electronic device as set forth in claim 1, wherein a mixed gas of a wet $N_2$ gas and a dry $N_2$ gas and $H_2$ gas is used to adjust the P3 and P4.

* * * * *